(12) United States Patent
Mohan et al.

(10) Patent No.: US 10,011,706 B2
(45) Date of Patent: Jul. 3, 2018

(54) SYSTEM AND METHOD FOR SYNTHESIS OF POSS-GRAPHENE OXIDE DERIVATIVES AS EFFECTIVE FILLERS FOR DEVELOPING HIGH PERFORMANCE COMPOSITES

(71) Applicant: The Board of Regents for Oklahoma State University, Stillwater, OK (US)

(72) Inventors: Muthu Subramanian Mohan, Tulsa, OK (US); Kunal Mishra, Tulsa, OK (US); Ranji K. Vaidyanathan, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 118 days.

(21) Appl. No.: 15/274,990

(22) Filed: Sep. 23, 2016

(65) Prior Publication Data

US 2017/0073505 A1 Mar. 16, 2017

Related U.S. Application Data

(63) Continuation-in-part of application No. 15/127,966, filed as application No. PCT/US2015/022019 on Mar. 23, 2015.

(Continued)

(51) Int. Cl.
*C08K 5/16* (2006.01)
*C09C 1/44* (2006.01)
(Continued)

(52) U.S. Cl.
CPC .................. *C08K 9/06* (2013.01); *C09C 1/44* (2013.01); *C08K 3/04* (2013.01); *C08K 3/042* (2017.05); *C08K 2201/011* (2013.01)

(58) Field of Classification Search
None
See application file for complete search history.

(56) References Cited

U.S. PATENT DOCUMENTS 3,245,865 A 4/1966 Hawkins et al.
5,484,867 A * 1/1996 Lichtenhan ............ C08G 77/04
525/474

(Continued)

FOREIGN PATENT DOCUMENTS

| CN | 101629010 | | 1/2010 |
|---|---|---|---|
| CN | 101629010 A | * | 1/2010 |
| CN | 102443247 | | 5/2012 |

OTHER PUBLICATIONS

Board of Regents for Oklahoma State University, "System and Method for Synthesis of POSS-Starch Derivatives as Effective Fillers for Developing High Performance Composites"; PCT/US2015/022019, Filed Mar. 23, 2015, International Search Report and Written Opinion.

*Primary Examiner* — Peter A Salamon
(74) *Attorney, Agent, or Firm* — Crowe & Dunleavy; Terry L. Watt

(57) ABSTRACT

According to an embodiment, a method for grafting POSS (polyhedral silsesquioxane) nanomaterial to graphene oxide is described for use in preparation of high performance composite materials. In another embodiment, amine functionalized graphene oxide may be particularly suitable. In this embodiment, POSS molecules grafted to amine functionalized graphene oxide are synthesized by reacting graphene oxide with different POSS molecules. The amine functionalized graphene oxide may be dissolved in a solvent and the reaction may include the presence of a catalyst. The resultant POSS grafted graphene oxide/POSS grafted amine functionalized graphene oxide may be mixed with a resin (epoxy) in a masterbatch. The masterbatch may then be (Continued)

packaged and sold. The masterbatch material may then be introduced into the interlaminar area of graphite/epoxy composites. Biodegradability and interlaminar fracture toughness testing results from the use of epoxy based nanocomposites containing POSS modified graphene oxide polymer are expected to improve.

15 Claims, 7 Drawing Sheets

Related U.S. Application Data

(60) Provisional application No. 61/968,583, filed on Mar. 21, 2014.

(51) Int. Cl.
*C08K 3/04* (2006.01)
*C08K 9/06* (2006.01)

(56) References Cited

U.S. PATENT DOCUMENTS

| | | | | |
|---|---|---|---|---|
| 5,939,576 | A * | 8/1999 | Lichtenhan | C07F 7/21 528/10 |
| 5,942,638 | A * | 8/1999 | Lichtenhan | C07F 7/21 528/10 |
| 6,094,338 | A * | 7/2000 | Hirahara | H01G 9/155 29/25.03 |
| 6,100,417 | A * | 8/2000 | Lichtenhan | C07F 7/21 528/25 |
| 6,770,724 | B1 * | 8/2004 | Lichtenhan | C07F 7/0885 528/12 |
| 6,933,345 | B1 * | 8/2005 | Lichtenhan | B82Y 30/00 525/101 |
| 2012/0010337 | A1 * | 1/2012 | Gilmartin | C07F 7/21 524/114 |
| 2012/0097352 | A1 | 4/2012 | Rasanen et al. | |

* cited by examiner

*Figure 1*
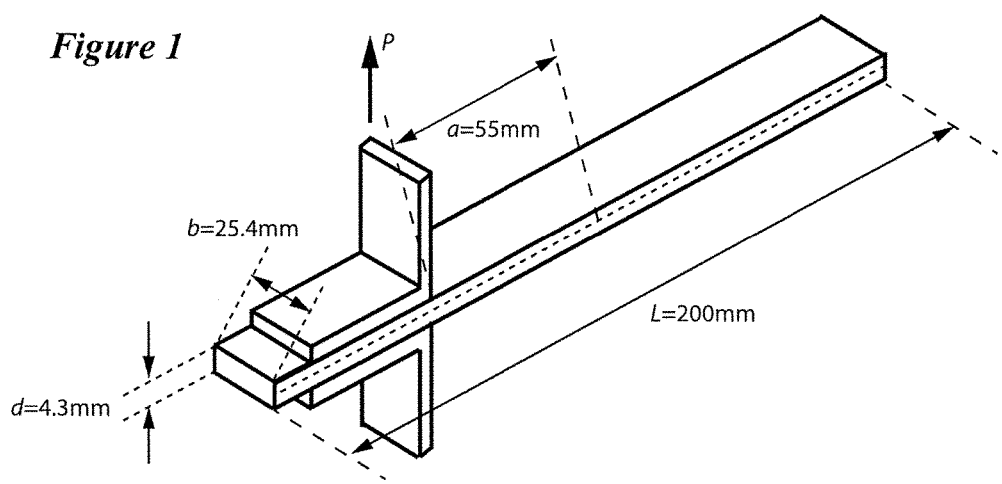
*Figure 2A*
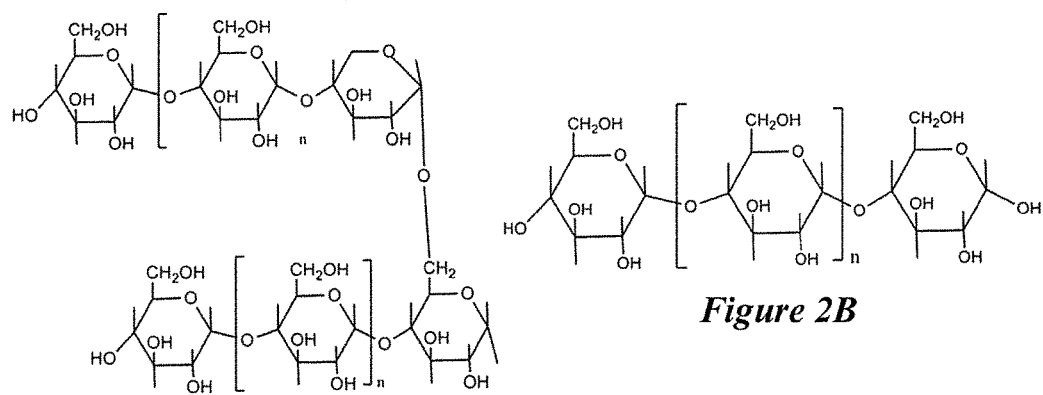
*Figure 2B*

SYSTEM AND METHOD FOR SYNTHESIS OF POSS-GRAPHENE OXIDE DERIVATIVES AS EFFECTIVE FILLERS FOR DEVELOPING HIGH PERFORMANCE COMPOSITES

CROSS REFERENCE TO RELATED APPLICATIONS

This application is a continuation-in-part of co-pending U.S. patent application Ser. No. 15/127,966, filed Sep. 21, 2016, which application is a 371 entry into the U.S. from pending PCT Patent Application No. PCT/US2015/022019, filed Mar. 23, 2015, which PCT application claims the benefit of U.S. Provisional Patent Application Ser. No. 61/968,583 filed on Mar. 21, 2014, and incorporates said applications by reference into this document as if fully set out at this point.

TECHNICAL FIELD

This disclosure relates to the general subject of nanomaterials and, more particularly the application of nano materials, to systems and methods for producing high performance composites.

BACKGROUND

It is well known that delamination fracture between plies is a serious problem in composites. Three are three main techniques for reducing the tendency for plies to delaminate: interleaving (inserting a tough layer of material between prepreg plies), Z-pinning (inserting rigid cured carbon fiber/BMI resin rods (Z-pins) into the laid up uncured plies), and stitching the prepregs.

Each of these approaches has certain disadvantages, though. For example, Z-pinning is only applied to prepreg type materials and results in as tremendous loss of in-plane properties. Stitching increases fracture toughness at the expense of in-plane mechanical properties.

Nanomaterials are of great interest due to their special physiochemical properties dramatically different from properties from the bulk counterparts. Nanoparticle or nanofibers, including nanoclay platelets, carbon nanotubes, and graphene have played an important role as fillers in polymeric composites to enhance the mechanical, electrical and optical properties. Among new nanoparticles, Polyhedral Oligomeric silsesquioxane (POSS), which are silica-based nanoparticles have attracted much attention for the past ten years. These are silica nanostructures with the empirical formula $RSiO_{1.5}$, where R may be a hydrogen atom or an organic functional group, such as alkyl, acrylate, hydroxide, or epoxide unit. It has been found that dispersing POSS nanoparticles into a polymer increases the strength, modulus, rigidity, and reduces the flammability, while retaining its lightweight and ductility.

Addition of nanofillers has the potential to drastically improve the mechanical and physical properties of composites. In some cases it might be dispersed in a polymer carrier (e.g., polyvinal pyrrolidone). This approach has been known to improve interlaminar fracture toughness by 100% or more. Improvement over reported values for CNT at much lower nanofiller content has been reported. Among the types of nanoparticles that have been utilized include graphene oxide and different polyhedral oligomeric silsequioxane (POSS).

Properties of POSS-containing polymer composites depend on the successful incorporation of POSS particles in polymeric matrices. There are two approaches to incorporate POSS particles into polymer matrices: (a) chemical cross-linking and (b) physical blending. In the first method, POSS nanoparticles are bonded covalently with the polymer. In the second approach, POSS nanoparticles are physically blended with polymer by melt mixing or solvent casting methods.

The effect of nanofillers depends on, among others, effective dispersion and interaction with the matrix (nanoparticle reactivity). However, no improvement is likely without using a polymer carrier, which might be explained by hydrogen bonding and interaction between nanoparticles and the matrix resin mediated by the carrier.

Additionally, there are several challenges that must be overcome in preparing POSS containing polymer composites, including long-range equilibration time, aggregation of nanoparticles, and costs that might be involved in large-scale production. However, if these issues could be resolved satisfactorily, the advantages would far outweigh the problems.

As is well known in the high performance composites arts, there has been a need for a system and method that provides a more effective way to create such composites and to make such composites more resistant to interlaminar fractures. Accordingly, it should now be recognized, as was recognized by the present inventors, that there exists, and has existed for some time, a very real need for an invention that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

Other embodiments and variations are certainly possible within the scope of the instant invention and can readily be formulated by those of ordinary skill in the art based on the disclosure herein.

Natural polymers such as starch have been used herein to enhance the dispersion of nanoparticles prior to their introduction into polymer composites. One advantage of this approach is that, due to the promotion of covalent bonding between these natural polymers and nanoparticles, their dispersion is enhanced and could potentially improve composite properties such as interlaminar fracture toughness without degrading other bulk properties such as flexural or shear strength.

One embodiment utilizes starch derivatized with POSS (polyhedral silsesquioxane) by reacting starch with different POSS molecules in a solvent and in presence of a catalyst. In this embodiment, the POSS content was varied from 3 to 30-wt % nanoparticle to starch ratios. IH-NMR, TGA, DSC, FT-IR, and SEM were used to characterize the POSS modified starch. This nanoparticle-natural polymer was then introduced into the interlaminar area of graphite/epoxy composites. Results showed that the interlaminar fracture toughness increased by more than 200% compared to graphite/epoxy composites with no interlaminar modification. The thermal and mechanical properties of the nanocomposites have been investigated by DSC, TGA, DMA, and by and mechanical testing. This approach could be generalized for many nanoparticle-natural polymer combinations for other types of polymer composites.

One embodiment of the invention teaches a method of synthesizing a POSS grafted polymer, comprising: selecting a POSS molecule including at least one reactive functional group capable of reacting with an —OH functional group; selecting a polymer molecule including at least one —OH functional group; exposing said POSS to said polymer such that said at least one reactive functional group of said POSS reacts with said —OH functional group of said polymer so as to graft said POSS to said polymer.

In another embodiment, a method for grafting various Polyhedral Oligomeric Silesquioxanes (POSS) materials to graphene oxide or preferably amine functionalized graphene oxide was developed. This embodiment may include a two-step process. An optional first step is to convert graphene oxide to amine functionalized graphene oxide.

In the optional first step, a graphene oxide / water mixture is ultra-sonicated for 30 minutes. Ethylene diamine is added to the mixture dropwise. The reaction is then refluxed for 24 hours at 90° C. under vigorous stirring. Resulting amine functionalized graphene oxide is washed with ethyl alcohol and then obtained using centrifugation. It should be understood by one of ordinary skill in the art that alternate methods of obtaining amine functionalized graphene oxide are known. In addition, amine functionalized graphene oxide is available commercially such as from Sigma-Aldrich (http://www.sigmaaldrich.com/catalog/product/Aldrich/805432?lang=en&region=US).

A required second step includes grafting the amine functionalized graphene oxide with various POSS nanofillers. This process includes dispersing the amine functionalized graphene oxide in a solvent such as dimethyl sulfoxide by ultrasonication. This is followed by the addition of POSS. A few milligrams of aluminum triflate may be added as a catalyst. The resultant POSS grafted graphene oxide is then washed and filtered using isopropyl alcohol. The amine functionalized graphene oxide can be reacted with various POSS containing reactive moieties such as epoxides, alcohols, carboxylic acids, acrylates, isocyanates.

The resultant POSS grafted graphene oxide/POSS grafted amine functionalized graphene oxide may be mixed with a resin (epoxy) and then introduced into the interlaminar area of graphite/epoxy composites. Alternatively, the resultant POSS grated graphene oxide/POSS grafted amine functionalized graphene oxide may be mixed with the resin in a masterbatch which may be packaged and sold as a commercial product. The masterbatch material may then be later employed by introduction into the interlaminar area of graphene/epoxy composites as desired/required.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 1 shows a configuration of the double cantilever beam specimen and $G_1c$ equation according to an embodiment.

FIG. 2A shows the chemical structure of amylopectin and FIG. 2B shows the chemical structure of amylose.

DETAILED DESCRIPTION OF THE PREFERRED EMBODIMENT

Figure 3:
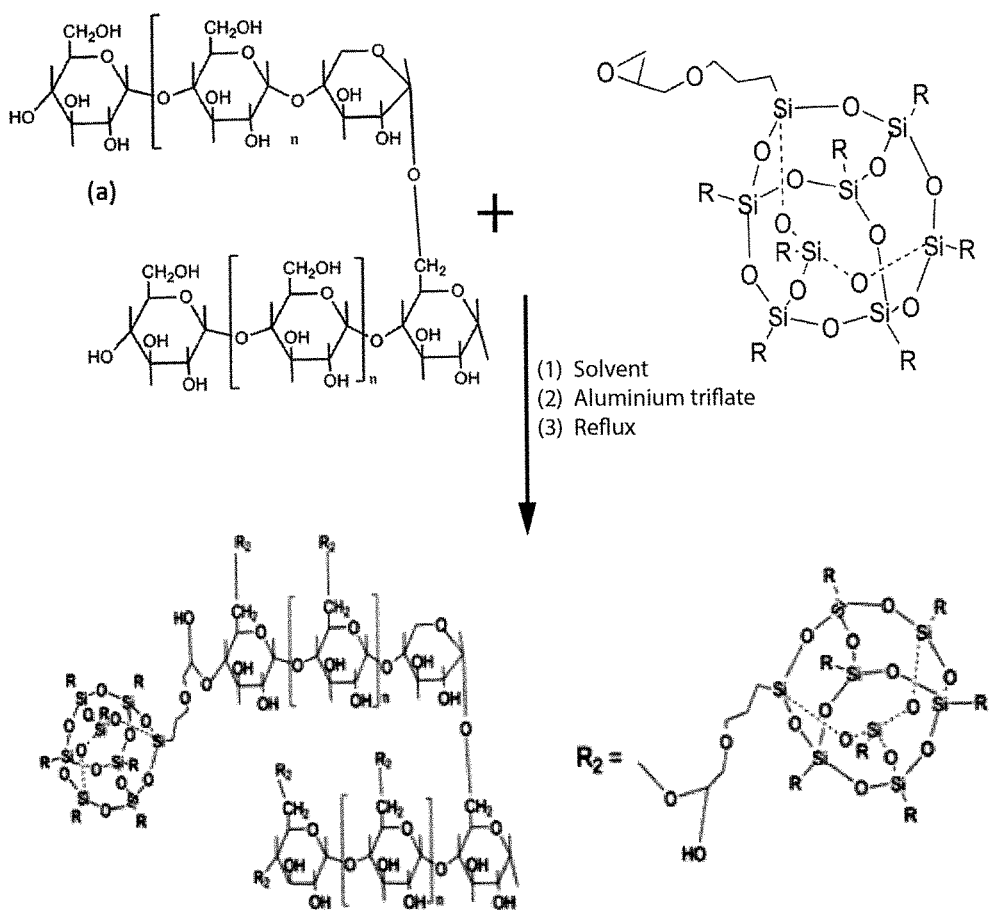
FIG. 3 shows a schematic representation of a POSS starch grafting reaction. Due to the steric hindrance, in this example very few POSS molecules are attached per glucose unit.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment, a method of grafting various polyhedral Oligomeric Silsesquioxane (POSS) molecules and other derivatives of POSS to natural polymers, including starch, lignin and cellulose is taught herein. POSS and the natural polymer were reacted in the weight ratio 1:3 in presence of a catalyst. The mixture was refluxed in dimethylsulfoxide for 1 hour at 80° C. The room temperature cooled mixture was added to equivalent amount of water, and solid grafted POSS-natural polymer product was obtained by filtration.

The invented nanofillers are highly dispersible in all types of composite resins and various organic solvents, including ethanol and acetone. The high and readily dispersible properties of the grafted nanofiller can find wide range of applications in the high performance composites world. In one embodiment, the inter-laminar fracture toughness of the carbon fiber loaded with 10 wt % of grafted nanofiller is shown to improve by 155% when compared to the control sample. An embodiment of the synthesis method taught herein can be extended to a wide variety of natural polymers containing reactive hydroxyl group and epoxide containing POSS molecules. This embodiment of the invention uses natural, sustainable polymers and can improve the mechanical properties without using expensive nanofillers such as carbon nanotubes.

Turning next to a description of one particular embodiment, POSS nanoparticles were grafted onto starch, a natural polymer, with the goal of developing sustainable composite materials, while improving interlaminar fracture toughness at the same time. An embodiment of the grafting reaction is described in the experimental section that follows. In a POSS grafted polymer (PGP), POSS nanoparticles are covalently bonded to the polymer molecule, avoiding issues with POSS agglomeration during the dispersion process. The polymer selected for POSS grafting is compatible with commonly used resins, and hence can be mixed with up to 30-wt % as a function of resin weight. In this embodiment, the PGP serves as both fillers and matrices of the composite allowing less amount of resin to be used, resulting in sustainable and cost-effective composites. At the same time, incorporation of high amounts of PGP is expected to uniformly distribute POSS nanoparticles throughout the matrices, resulting in enhanced mechanical properties. The interlaminar fracture improvement toughness of the carbon fiber prepregs is achieved through the incorporation of POSS grafted polymer.

Figure 6:
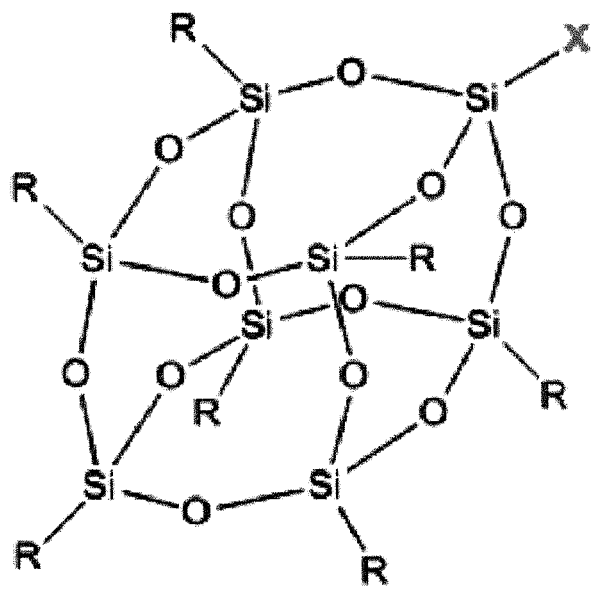
FIG. 6 contains a structural diagram for an embodiment of POSS.

FIG. 6 contains a structure diagram of POSS suitable for use with an embodiment. According to this embodiment, R is an unreactive organic group, and X is a reactive functional group suitable for polymerization and grafting. The nanomaterial of this variation is 1-3 nm in size and contains organic hydrocarbon branches. This is a thermally and chemically robust inorganic-organic hybrid nanomaterial and is a promising nanofiller for reinforcing polymer coils at the molecular level.

The POSS that was selected has one glycidyl group as the most reactive functional group. It is denoted as X in the structure. The X can be any functional group that can react with the —OH group of polymers, including Starch, Cellulose, graphene oxide and lignin or any polymer that has —OH functional group. The functional group X can be amine, acetyl chloride, acid anhydride or epoxy group. R can be any alkyl or aryl group which is usually non-functional, and it includes methyl, phenyl. Butyl, isobutyl, propyl, ethyl etc.

With respect to testing, according to an embodiment the nanofiller was coated on the interlaminar surface of carbon fiber. The Mode 1 fracture toughness was measured. Epoxy composite containing grafted nanofiller was fabricated. DMA and flexural tests were conducted. Additional details are described in the text that follows.

Materials

According to one embodiment and as is described in detail below, a glycidyl isobutyl POSS formulation (EPO418 from Hybrid Plastics) was purchased from Hybrid Plastics, Hattiesburg, Miss. Starch was purchased from Fisher Scientific. The carbon fiber epoxy prepreg (63% fiber content) for these experiments was purchased from TCR Composites (Ogden, Utah). The carbon fiber is a 3K plain-weave fabric, while the epoxy resin is a Novolac type. Epoxy resin, EPON®-Resin 828 used for the flexural test was obtained from Momentive, Columbus, Ohio.

Polyvinyl pyrrolidone (PVP) K-90 was purchased from Ashland Inc. special chemicals division. In one embodiment PVP acted as a solid disperser (dispersant), carrier and stabilizer for the nanoparticles. It is also a compatibilizer for resin systems.

Synthesis of POSS Grafted Starch Nanomaterial

A reaction process was carried out in a glove box to avoid contamination with moisture and oxygen. In a typical reaction, 3 parts by weight of the glycidyl isobutyl POSS formulation and 10 parts by weight of starch were dissolved in dimethyl sulfoxide solvent. 10 mg of aluminum triflate catalyst was added in the mixture, and the reaction was refluxed for one hour at 80° C. After cooling to room temperature, the mixture was diluted with an equal volume of cold deionized water, and filtered through Whatman filter no. 2. The residue was washed three times with water and dried under vacuum at room temperature.

Nanomaterial dispersion was obtained by magnetically stirring for about 10 minutes a 5% alcoholic solution of PVP-K90 and the grafted nanomaterial. Different weight percentages of PVP were utilized (e.g., 2%, 3%, 7%, and 10%).

Modification of Interlaminar Interface in Carbon Epoxy Composites Using POSS Grafted Polymer (PGP) and PVP Blend The interlaminar interface of carbon fiber epoxy composites was modified using PVP containing different weight percent of POSS grafted polymer. The solution of PGP-PVP was uniformly applied by paintbrush in the mid-plane of 16 layers of carbon prepreg and cured in a hot press for performing a double cantilever beam (DCB) test. A pre-crack was generated by introducing a 13 μm thick Teflon sheet in the mid-plane of the composite laminate.

Flexural Strength Test

The three point bending flexural test and flexural modulus test of pure epoxy (Epon® 828) composites with and without POSS grafted polymer (PGP) filler was performed at room temperature as per ASTM D 790 standard using an Instron Model 5567 screw testing machine. These samples only contained epoxy resin and the PGP filler materials. The cross head speed was determined using the standard equation and the calculated value was 1.13 mm/min.

Double Cantilever Beam (DCB) Tests

The energy absorption capability of carbon fiber epoxy composites with and without any interlaminar interface modification was measured in terms of Mode I fracture toughness by performing a Double Cantilever Beam (DCB) test. These tests were performed at room temperature as per ASTM D 5528 and using an Instron Model 5567 testing machine. The test configuration of the specimens is shown in FIG. 1. The load-displacement curves were obtained for three samples under each test condition. The fracture toughness values were obtained using a modified beam theory (MBT). The value of cross head speed was calculated as 5 mm/min.

FIG. 1 contains an exemplary configuration of a double cantilever beam specimen. An equation for $G_1c$ follows:

$$G_{1c} = \frac{3*P*\delta}{2*b*(a+|\Delta|)},$$

where, $G_{1C}$ is the mode I fracture toughness (J/m$^2$), P is the load (N), δ is the load point displacement (mm), b is the width of the specimen (mm), a is the delamination length (mm), and Δ is the correction factor for MBT.

Results and Discussion Pertaining to an Embodiment
Starch Polymer Grafted POSS Nanomaterial According to an embodiment, the attachment of the POSS molecule to the starch polymer takes place through the reaction of epoxide group of POSS and the alcohol group of the starch polymer. The attachment of one POSS molecule per unit glucose unit of the polymer is highly advantageous to achieve the arrangement of POSS molecules far apart as possible. This will tend to prevent the agglomeration of POSS molecules, and help produce uniform dispersion of nanoparticle even at high loading concentrations. Amylopectin is one of the two components of starch used for grafting to the POSS molecule. Amylopectin is branched and has less number of —OH groups compared to amylose which is linear. Embodiments of the chemical structures of the two components of starch are shown in FIG. 2: amylopectin (FIG. 2A) and amylose (FIG. 2B). The bulky nature of POSS molecule and network structure of the amylopectin can cause steric hindrance. Due to this, it is presumed that no more than two POSS molecules will be attached per glucose unit. The schematic of the grafting reaction and the presumed structure of the final product are shown in FIG. 3.

It is expected that POSS nanoparticles attached to the amylopectin are covalently bonded and are separated from one another. The grafted nanomaterial was found to be readily soluble in an organic solvent, such as ethyl alcohol, acetone, and readily dispersible in the resin at high percent concentration, including polyester, polyurethane, vinyl ester and epoxy resins. It can be dispersed with or without a PVP carrier. It is, therefore, possible to obtain high percent dispersion of nanomaterials in the resin matrix. High dispersion of nanomaterial in the composites can enhance various mechanical properties, including fracture toughness, flexural and compression strength and reduce gas permeability. It can be applied, for example, as a film, spray or paint, with spray or point being preferred in some embodiments.

Example of matrix resins that would be suitable for use with different embodiments of the invention include, without limitation, epoxy resins, ester-based resins—vinyl ester or cyanate ester, and, bismaleimide (BMI).

The instant graphing process can be extended to other naturally available polymers to include starch, cellulose, graphene oxide and lignin or any polymer that has at least one —OH functional group. An embodiment shows mode 1 fracture toughness improved by about 100% and a storage modulus that was improved by a factor of three.

Mode I Fracture Toughness

Figure 4:
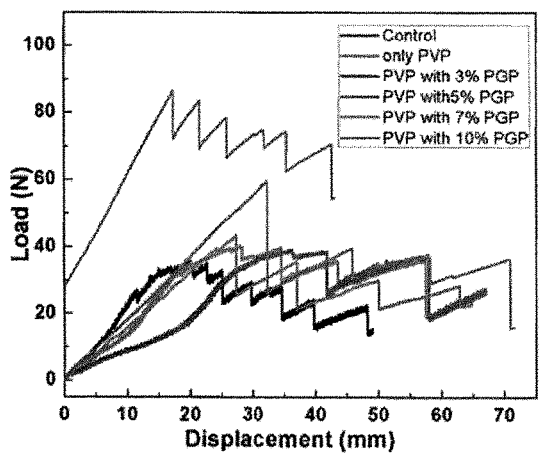
FIG. 4 contains an example plot of load versus crack growth for carbon fiber epoxy composites.

The load displacement DCB test curves for all the sets of carbon fiber composites containing different wt % (3, 5, 7, and 10%) of POSS grafted polymer (PGP) as a function of PVP weight are shown in FIG. 4. It is apparent from the curves that the crack growth is not continuous, but a sequence of growth and arrest. The DCB samples containing 3, 5 and 10% PGP showed that the initial rise in load is sudden without any sign of cracking. The initial surge in the load is followed by normal load elongation behavior, demonstrating that crack arresting tendency is drastically improved for the composites loaded with approximately 3 to 10-wt % PGP (preferred range). As result, the composites tend to exhibit very high values of Mode I fracture toughness.

Figure 5:
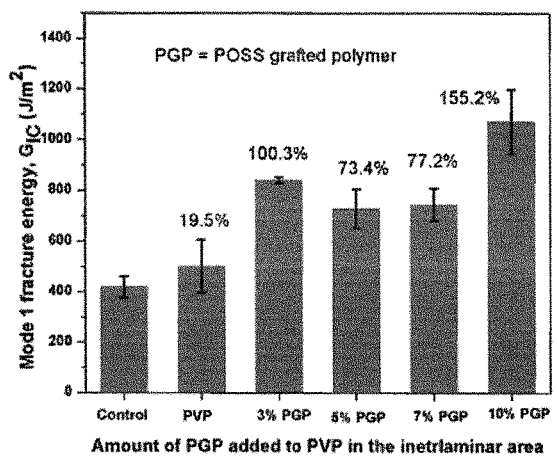
FIG. 5 shows an example plot of Mode I fracture energy versus % nanoparticles in the interlaminar area.

The $G_{1C}$ values for the various types of composites were calculated using the equation presented previously. The average $G_{1C}$ values for the composites containing various weight percent of PGP nanoparticles is shown in FIG. 5. The maximum increase in $G_{1C}$ values was shown in the case of composites loaded with 10 wt % of PGP, ~155% improvement in Mode 1 fracture toughness when compared with the control sample. The 155% improvement is 50% higher than through the addition of graphene oxide or only POSS formulations tested earlier [11, 12]. Further experiments are under progress to assess the influence of higher % (up to 30% or even more) of PGP on the mode I fracture toughness of carbon fiber composite. The coating material consists of PVP and Starch-POSS grafted polymer. The DCB samples coated only with one component, including starch, POSS, and unreacted starch-POSS mixtures will also be assessed and compared to verify the effect of grafted starch POSS nanomaterial in improving the Mode 1 fracture toughness. Agglomeration of nanoparticles and decrease in mode 1 fracture toughness is expected above 30% nanoparticles load. The 10% nanoparticle addition is equivalent to less than 1% by weight of the composite and did not seem to affect the mechanical properties [11, 12]. According to one embodiment, the 10% weight percent was obtained by adding 0.5 gram of nanofiller in 100 ml of solution then applying roughly 3 ml of solution.

Flexural Test

The average flexural strength of the epoxy (Epon 828) composite samples containing 3 wt % of PGP filler as a function of epoxy weight was found to be 30% higher when compared to the control samples containing no filler Another Embodiment According to another embodiment, there is provided a method of grafting various Polyhedral Oligomeric Silesquioxanes (POSS) materials to graphene oxide. In a variation of this embodiment, there is provided a method of grafting various Polyhedral Oligomeric Silesquioxanes (POSS) materials to amine functionalized graphene oxide.

Figure 10:
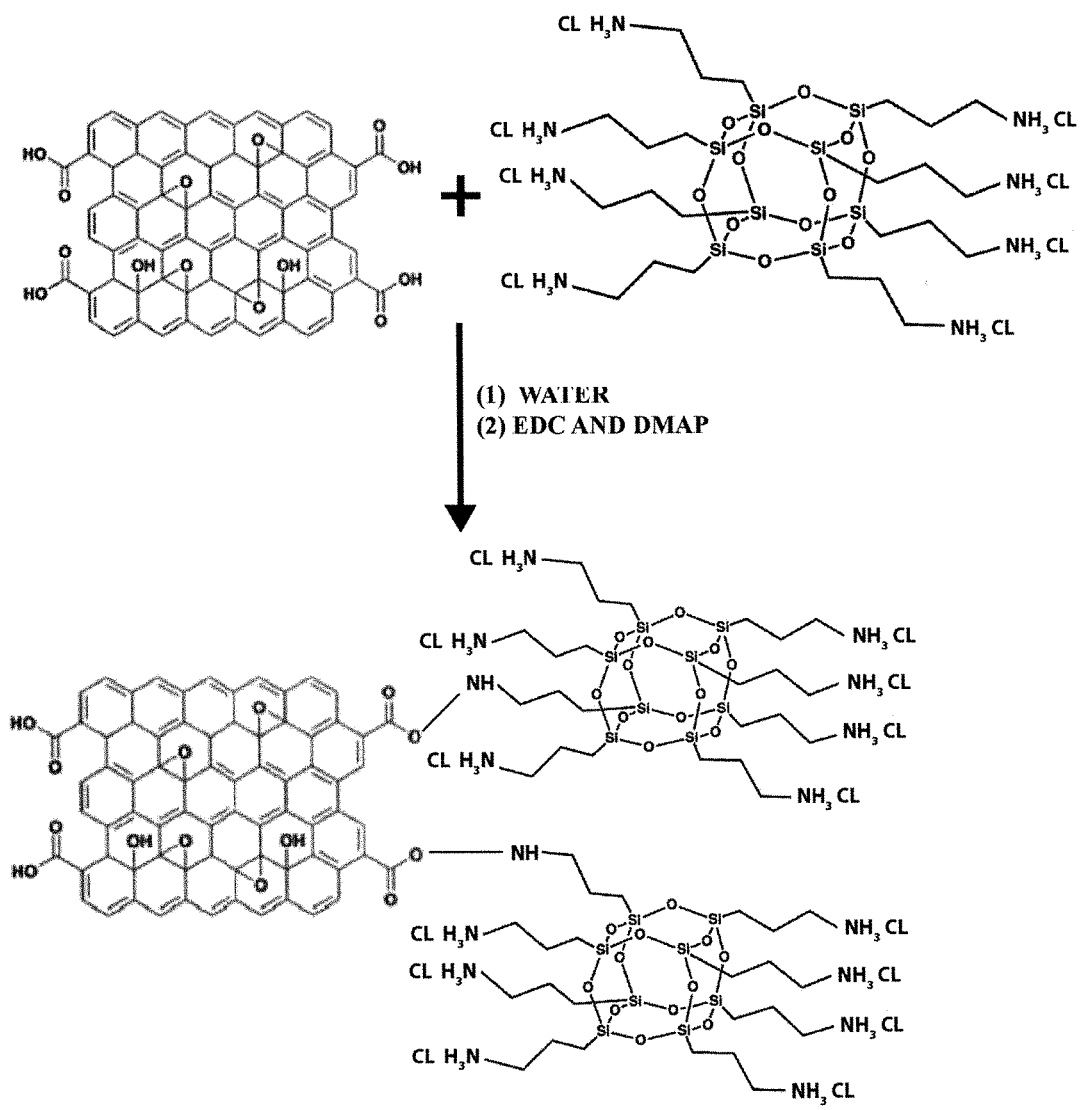
FIG. 10 depicts a schematic representation of a reaction wherein a molecule of OctaAmmonium POSS is grafted to graphene oxide according to the process of the present disclosure.

In an example of this embodiment, as shown in FIG. 10, graphene oxide was reacted with POSS nanofiller. This process includes dispersing graphene oxide in a solvent. It has been found that water is a suitable solvent. Graphene oxide was dispersed in water by ultra-sonication. This dispersion step was followed by the addition of POSS. In this example, OctaAmmonium POSS was selected as a suitable POSS. A few milligrams of 1-Ethyl-3-(3-dimethyl-aminopropyl) carbodiimide (EDC) and 4-Dimethyl amino pyridine were then added as a catalyst. The resultant POSS grafted graphene oxide was then washed and filtered with a large amount of water. This nanofiller has a broad range of applications in, for example, the composite industry.

Figure 7:
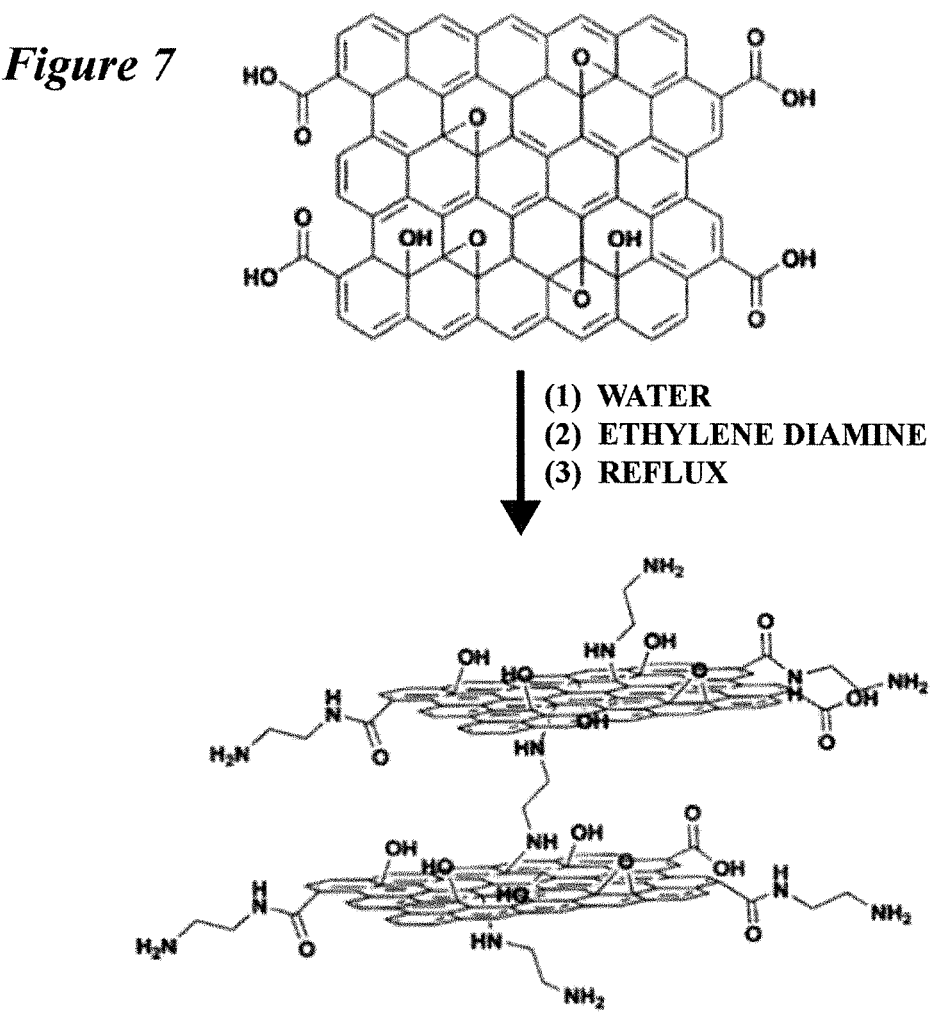
FIG. 7 depicts a schematic representation of an exemplary reaction converting graphene oxide to amine functionalized graphene oxide according to the process of the present disclosure.

In an alternate embodiment of the method of the present disclosure, the process could include reacting amine functionalized graphene oxide with POSS molecules. According to one approach, this may comprise a two-step process. With reference to FIG. 7, as depicted therein, a first step was to convert graphene oxide to amine functionalized graphene oxide. In this example, a Graphene oxide I water mixture was ultra-sonicated for 30 minutes. Ethylene diamine was added dropwise to the mixture. The reaction was then refluxed for 24 hours at 90° C. under vigorous stirring. Amine functionalized graphene oxide was washed with ethyl alcohol and then obtained using centrifugation.

In some cases graphene oxide can be functionalized with amine groups by using a highly reactive ethylene diamine. In a typical example reaction, 400 mg of graphene oxide is dispersed in 200 ml of water by ultra-sonication for 30 minutes. Following this, 5 g of ethylene diamine is added drop by drop. Then the mixture is refluxed at 80° C. for 24 hours. The final dispersion is precipitated and filtered using isopropyl alcohol. The product is vacuum dried for 6 hours at 70° C.

It should be understood by one of ordinary skill in the art that alternate methods of obtaining amine functionalized graphene oxide are known. For example and without limitation, amine functionalized graphene oxide is available commercially such as from Sigma-Aldrich (http://www.sigmaaldrich.com/catalog/product/Aldrich/805432?lang=en&region=US).

Figure 8:
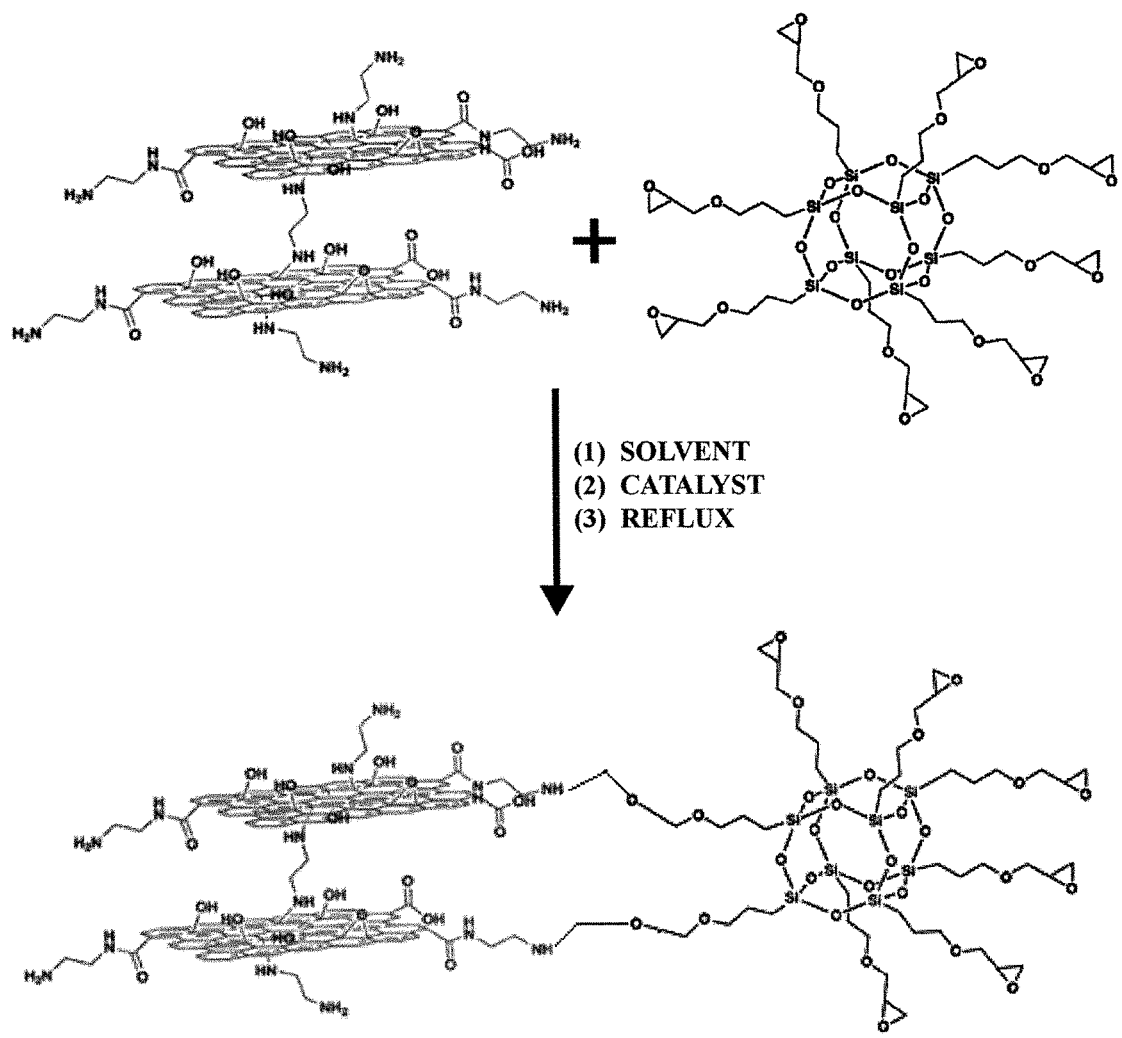
FIG. 8 depicts a schematic representation of a reaction wherein a POSS molecule is grafted to amine modified graphene oxide according to the process of the present disclosure.

Next with reference to FIG. 8, a second step was to react the obtained amine functionalized graphene oxide with various POSS nanofillers. The process involves dispersing the amine functionalized graphene oxide in dimethyl sulfoxide by ultra-sonication. Continuing with the present example, this was followed by the addition of POSS. A few milligrams of aluminum triflate were then added as a catalyst. POSS grafted graphene oxide was then washed and filtered using isopropyl alcohol. This hybrid nanofiller has a broad range of applications in, for example, the composite industry.

The amine functionalized graphene oxide in this embodiment of the process of the present disclosure can be reacted with various POSS containing reactive moieties such as epoxides, alcohols, carboxylic acids, acrylates, isocyanates. By way of example and not limitation, suitable POSS containing reactive moieties could include:

POSS containing Epoxy groups:
Epoxycyclohexyllsobutyl POSS, Epoxycyclohexyl POSS Cage Mixture, Glycidyl POSS Cage Mixture, Glycidyllsobutyl FOSS, Triglycidyllsobutyl POSS, Octa Epoxycyclohexyl dimethylsilyl POSS and OctaGlycidyldimethylsilyl POSS.
POSS containing carboxylic acids:
OctaMaleamic Acid POSS and Maleamic Acid-Isobutyl POSS.
POSS containing acrylo groups:
Acrylolsobutyl POSS and Acrylo POSS Cage Mixture.
POSS containing methacrylate groups:
Methacrylolsobutyl POSS, Methacrylate Isobutyl POSS, Methacrylate Ethyl POSS, MethacrylEthyl POSS, Methacryl POSS Cage Mixture, Methacryllsooctyl POSS and Methacrylate Isooctyl POSS.

As would be understood by one of skill in the art, POSS grafted graphene oxide produced according to the above method could be mixed with POSS grafted amine functionalized graphene oxide produced as described above. In addition, it should be understood that POSS grafted amine functionalized graphene oxide including different POSS moieties produced according the method of the present disclosure could be mixed for use in composite structures or for other commercial applications. It is further understood that POSS grafted graphene oxide and/or POSS grafted amine functionalized graphene oxide produced according the above method could be mixed with POSS grafted starch produced as described above such that differing characteristics are obtained.

In an alternate embodiment of the method of the present disclosure, the second step could include reacting amine functionalized graphene oxide with POSS material. The amine functionalized graphene oxide and POSS are dispersed in dimethyl sulfoxide by ultra-sonicating for 1 hour. A few milligrams of Aluminum Triflate as catalyst may be added to the mixture and the reaction continued for 24 hours at 90° C. The final dispersion may then be precipitated and filtered using isopropanol. Then the product was vacuum dried for 8 hours at 70° C.

Figure 9:
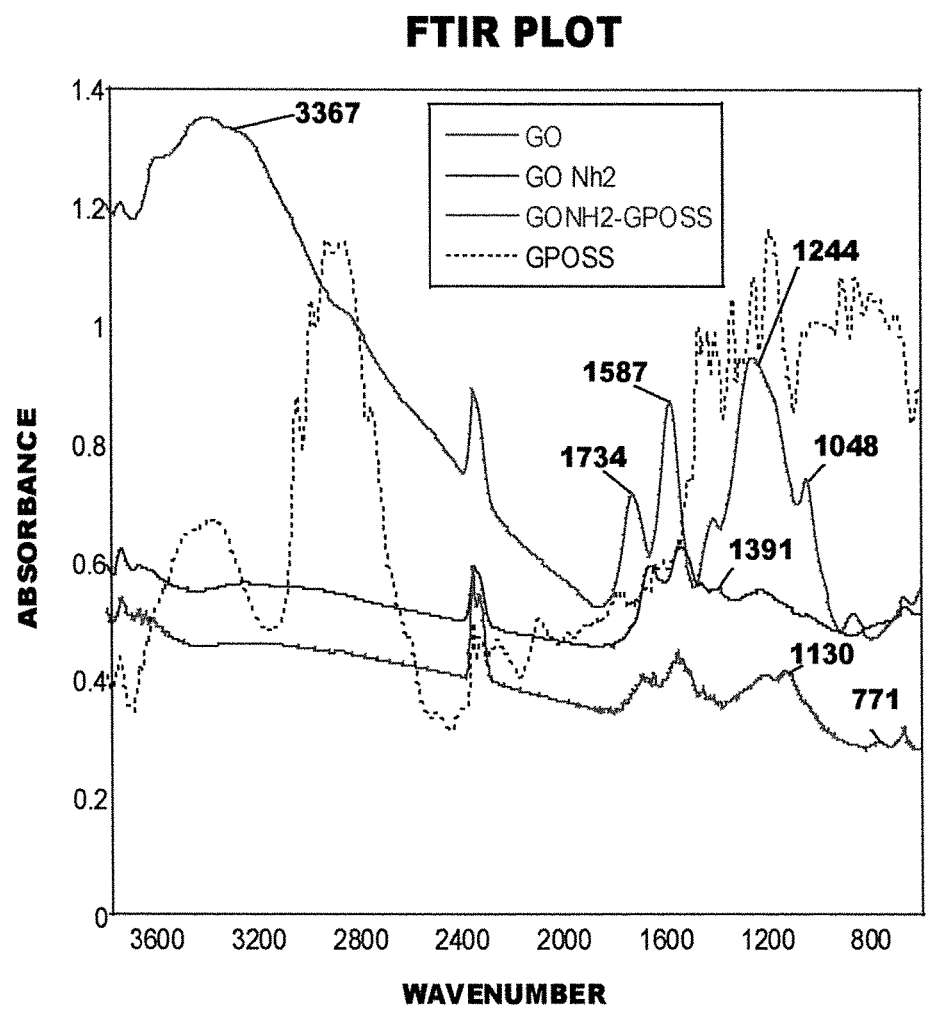
FIG. 9 contains a FTIR plot for nanomaterials produced according to a method of the present disclosure.

Turning next to FIG. 9, the FTIR plot in this figure confirms the reaction of amine functionalized graphene oxide and POSS grafted graphene oxide. The graphene oxide peaks around 3367 cm$^{-1}$, 1734 cm$^{-1}$ and 1587 cm$^{-1}$, 1244 cm$^{-1}$ and 1048 cm$^{-1}$ corresponds to —OH stretching, C=O stretching of COOH groups, C—O stretching in epoxy and —C—O—C stretching in epoxide group respectively. The amine functionalization was confirmed by complete disappearance of 3367 cm$^{-1}$ peak and peak shifts of 1734 cm$^{-1}$ and 1587 cm$^{-1}$. The significant reduction in the intensities of peaks (1244 cm$^{-1}$ and 1048 cm$^{-1}$) corresponding to the epoxy groups and simultaneous formation of characteristic band of —C—N group at 1391 cm$^{-1}$ confirms the reduction of graphene oxide. The amine functionalized graphene oxide grafted with Glycidyl POSS was confirmed by the formation of two new peaks 1130 cm$^{-1}$ and 771 cm$^{-1}$. The former peak corresponds to Si—O—Si group in POSS and latter ascribes to the formation of urea linkage between amine groups of graphene oxide and epoxides of POSS.

Although past attempts at using graphene oxide and POSS in the field of nanocomposites presented some promising improvements in various areas, both had the problem of agglomerating when highly loaded into composites separately. Hence this has meant that higher loadings of these nanofillers were previously problematic. As such, there is provided in this embodiment a method of solving this agglomeration problem that is known previously to those of skill in the art with the use of nanoparticles. In addition, the yield of resultant nanocomposite material has been determined to be high, at over 80%.

The resultant POSS grafted graphene oxide/POSS grafted amine functionalized graphene oxide produced according to an embodiment of the method of the present disclosure may be mixed with a resin (epoxy) and then introduced into the interlaminar area of graphite/epoxy composites. Alternatively, the resultant POSS grafted graphene oxide/POSS grafted amine functionalized graphene oxide may be mixed with the resin in a masterbatch which may be packaged and sold as a commercial product. The masterbatch can be prepared by adding the POSS grafted graphene oxide and/or POSS grafted functionalized graphene oxide and resin components into a high speed mixer. Such high speed mixers are known and available commercially which have the ability to mix the resin and filler component in about 5 minutes. It is contemplated that the resultant masterbatch can be stored under ambient conditions. It is further contemplated that the stored masterbatch may turn viscous over time because of crystallization. In that event, the masterbatch should be heated at 50° C. until the viscosity becomes normal. The masterbatch material may then be later employed by introduction into the interlaminar area of graphene/epoxy composites as desired/required or may be suitable for other commercial applications.

CONCLUSIONS

According to one embodiment, nanoparticles of POSS grafted polymer (PGP) were synthesized and used to improve the interlaminar fracture toughness of carbon fiber epoxy composites. The interlaminar interface of carbon fiber epoxy composites was modified by applying PVP dispersed PGP between the plies of composite laminates. Improvement of up to ~155% in the Mode I fracture toughness ($G_1c$) was observed using 10-wt % PGP nanoparticles as a function of PVP (<0.5% by weight of the composite). Additionally, this improvement was 50% better than previously achieved with graphene oxide or POSS alone. Unlike traditional toughening methods, this enhancement was achieved without sacrificing the mechanical properties of the composites. Epoxy composite loaded with 3 wt % PGP nanoparticles showed 30% improvement in flexural strength.

Generally speaking, interlaminar fracture toughness increases with grafted nanofiller content. The effect was not pronounced at lower grafted nanofiller contents. One embodiment utilized about 10 wt % nanoparticles (less than 1% by weight) and yielded an increased fracture toughness of about 100%. The saturation point might be around 30% (or even higher) which should be compared with the typical 5-7% of other nanofillers.

The test results showed that PGP nanoparticles could function as excellent fillers. The nanoparticle-grafted polymers are highly compatible with the commonly used resins, and hence expected that it can be mixed up to 30-wt % as a function of resin weight. The PGP serves as both fillers and matrices of the composite that allows less amount of resin to develop sustainable composites.

For purposes of this disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of synthesizing a nanomaterial for use in the construction of composite structures, comprising:
   obtaining a POSS molecule including reactive moities selected from the group consisting of epoxides, alcohols, carboylic acids, acrylates, methacrylates, isocyanates, and combinations thereof;
   obtaining an amine functionalized graphene oxide;
   reacting said POSS molecule with said amine functionalized graphene oxide so as to graft said POSS molecule to said amine functionalized graphene oxide.

2. The method of claim 1 wherein said reactive moities are epoxides selected from the group consisting of EpoxycyclohexylIsobutyl POSS, Epoxycyclohexyl POSS Cage Mixture, Glycidyl POSS Cage Mixture, GlycidylIsobutyl POSS, TriglycidylIsobutyl POSS, Octa Epoxycyclohexyl dimethylsilyl POSS and OctaGlycidyldimethylsilyl POSS.

3. The method of claim 1 where said reactive moities are carboxylic acids selected from the group consisting of OctaMaleamic Acid POSS and Maleamic Acid-Isobutyl POSS.

4. The method of claim 1 wherein said reactive moities are acrylates selected from the group consisting of AcrylolsobutyI POSS and Acrylo POSS Cage Mixture.

5. The method of claim 1 wherein said reactive moieties are methacrylates selected from the group consisting of MethacrylolIsobutyl POSS, Methacrylate Isobutyl POSS, Methacrylate Ethyl POSS, MethacrylEthyl POSS, Methacryl POSS Cage Mixture, MethacrylIsooctyl POSS and Methacrylate Isooctyl POSS.

6. The method of claim 1 wherein said amine functionalized graphene oxide is obtained by reacting aqueous graphene oxide with ethylene diamine.

7. The method of claim 1 wherein said amine functionalized graphene oxide is dispersed in a solvent.

8. The method of claim 7 wherein said solvent is selected from a group consisting of dimethyl sulfoxide, tetrahydrochloroform, chloroform and toluene.

9. The method of claim 7 wherein said amine functionalized graphene oxide is dispersed in said solvent by ultrasonication.

10. The method claim 7 wherein said reaction includes a catalyst.

11. The method of claim 10 wherein said catalyst is aluminum triflate.

12. The method of claim 9 wherein said POSS grafted amine functionalized graphene oxide is precipitated, filtered and dried.

13. The method of claim 1 wherein said POSS grafted amine functionalized graphene is mixed with resin to form a masterbatch.

14. The method of claim 11 wherein said masterbatch is reduced and packaged for commercial sale.

15. The method of claim 10 wherein said catalyst is selected from the group consisting of metal triflates and lithium bromide.

* * * * *

UNITED STATES PATENT AND TRADEMARK OFFICE
CERTIFICATE OF CORRECTION

PATENT NO. : 10,011,706 B2
APPLICATION NO. : 15/274990
DATED : July 3, 2018
INVENTOR(S) : Mohan et al.

Page 1 of 1

It is certified that error appears in the above-identified patent and that said Letters Patent is hereby corrected as shown below:

In the Specification

Column 1 Line 6 add Government Rights Clause:
"This invention was made with Government support under Grant No. NNX14AN41A awarded by the National Aeronautics and Space Administration (NASA). The Government has certain rights in the invention."

Signed and Sealed this
Twenty-eighth Day of January, 2020

Andrei Iancu
*Director of the United States Patent and Trademark Office*